United States Patent [19]

Mischutin

[11] Patent Number: 4,600,606

[45] **Date of Patent: * Jul. 15, 1986**

[54] PROCESS FOR RENDERING NON-THERMOPLASTIC FIBROUS MATERIALS FLAME RESISTANT TO MOLTEN MATERIALS BY APPLICATION THERETO OF A FLAME RESISTANT COMPOSITION, AND RELATED ARTICLES AND COMPOSITIONS

[75] Inventor: Vladimir Mischutin, East Brunswick, N.J.

[73] Assignee: White Chemical Corporation, Newark, N.J.

[ * ] Notice: The portion of the term of this patent subsequent to May 1, 2001 has been disclaimed.

[21] Appl. No.: 598,700

[22] Filed: Apr. 10, 1984

Related U.S. Application Data

[60] Continuation of Ser. No. 266,000, May 21, 1981, Pat. No. 4,446,202, which is a continuation-in-part of Ser. No. 31,307, Apr. 18, 1979, Pat. No. 4,348,306, which is a division of Ser. No. 797,767, May 17, 1977, Pat. No. 4,158,073, which is a division of Ser. No. 538,896, Jan. 6, 1975, abandoned, which is a division of Ser. No. 300,732, Oct. 25, 1972, abandoned.

[51] Int. Cl.[4] .......... B32B 27/20

[52] U.S. Cl. .......... 427/389; 252/608; 427/389.8; 427/389.9; 427/391; 427/392; 427/393; 427/393.3; 427/393.5; 428/254; 428/263; 428/264; 428/265; 428/275; 428/290; 428/379; 428/389; 428/393; 428/396; 428/507

[58] Field of Search .......... 428/254, 263, 264, 265, 428/275, 290, 379, 389, 393, 396, 507, 921; 252/608; 427/389, 389.8, 389.9, 391, 392, 393, 393.3, 393.5

[56] References Cited

U.S. PATENT DOCUMENTS

| | | | |
|---|---|---|---|
| T900,021 | 7/1972 | Caldwell et al. . | |
| 1,827,263 | 12/1931 | Roman | 106/15 |
| 2,462,803 | 2/1949 | Campbell | 260/28 |
| 2,496,745 | 2/1950 | Olson | 260/28.5 |
| 2,520,103 | 8/1950 | Loukomsky | 117/137 |
| 2,668,294 | 2/1954 | Gilpin | 2/114 |
| 2,686,767 | 8/1954 | Green | 260/29.6 |
| 2,912,392 | 11/1959 | Stilbert | 260/27.4 |
| 2,953,480 | 9/1960 | Burnell | 117/137 |
| 2,960,463 | 11/1960 | Hechenbleikner | 252/8.1 |
| 3,038,820 | 6/1962 | Albrecht | 117/139.5 |
| 3,047,425 | 7/1962 | Hirshfield | 117/137 |
| 3,080,316 | 3/1963 | Peteryl | 252/2 |
| 3,093,599 | 7/1963 | Mueller-Tamm | 260/2.5 |
| 3,201,265 | 8/1965 | Hodnefield | 106/15 |
| 3,300,423 | 1/1967 | Brown | 260/17 |
| 3,305,431 | 2/1967 | Peterson | 428/499 |
| 3,324,205 | 6/1967 | Carpenter | 260/963 |
| 3,378,381 | 4/1968 | Draganov | 106/15 |
| 3,431,140 | 3/1969 | Beachem | 117/121 |
| 3,432,461 | 3/1969 | Hill | 524/585 |
| 3,470,116 | 9/1969 | Praetzel et al. | 260/2.5 |
| 3,591,507 | 7/1971 | Drake et al. | 106/18.24 |
| 3,620,797 | 11/1971 | Feltkowitz | 117/7 |
| 3,639,304 | 2/1972 | Raley | 521/140 |
| 3,655,607 | 4/1972 | Bockstie | 260/33.8 |
| 3.658,634 | 4/1972 | Yanagi et al. | 161/175 |
| 3,660,346 | 5/1972 | Gray | 260/41 |
| 3,668,155 | 7/1972 | Raley | 260/2.5 |
| 3,682,692 | 8/1972 | Lamson | 117/137 |
| 3,689,355 | 9/1972 | Hornbaker et al. | 428/263 |
| 3,695,925 | 10/1972 | Weil | 252/609 |
| 3,707,385 | 12/1972 | Kraemer | 106/15 |
| 3,709,876 | 1/1973 | Glomski | 260/231 |
| 3,715,310 | 2/1973 | Butcher | 252/8.1 |
| 3,729,434 | 4/1973 | Todd | 106/15 |
| 3,749,600 | 7/1973 | Bergman | 117/136 |
| 3,758,335 | 9/1973 | Bergman | 117/136 |
| 3,764,374 | 10/1973 | Barton | 427/394 |
| 3,770,577 | 11/1973 | Humphrey | 162/159 |
| 3,814,624 | 6/1974 | Scarborough | 117/136 |
| 3,816,307 | 6/1974 | Woods | 252/8.1 |
| 3,830,766 | 9/1974 | Praetzel et al. | 117/136 |
| 3,855,134 | 12/1974 | Green | 252/606 |
| 3,955,032 | 5/1976 | Mischutin | 428/921 |
| 3,965,197 | 6/1976 | Stepnicza | 260/623 |
| 3,989,531 | 11/1976 | Orlando | 524/288 |
| 4,034,141 | 7/1977 | Duffy et al. | 428/473 |
| 4,058,466 | 11/1977 | Scharf | 252/607 |
| 4,113,902 | 9/1978 | Mischutin | 428/921 |
| 4,446,202 | 5/1984 | Mischutin | 428/254 |

FOREIGN PATENT DOCUMENTS

| | | |
|---|---|---|
| 1191569 | 4/1965 | Fed. Rep. of Germany . |
| 1669079 | 2/1966 | Fed. Rep. of Germany . |
| 1594962 | 11/1966 | Fed. Rep. of Germany . |
| 1469899 | 3/1969 | Fed. Rep. of Germany . |
| 1594948 | 9/1969 | Fed. Rep. of Germany . |
| 2001125 | 9/1970 | Fed. Rep. of Germany . |
| 2262779 | 12/1971 | Fed. Rep. of Germany . |
| 2015100 | 4/1970 | France . |
| 2089142 | 1/1972 | France . |
| 514014 | 11/1971 | Switzerland . |
| 1292878 | 10/1972 | United Kingdom . |

OTHER PUBLICATIONS

*Handbook of Chemistry & Physics,* 49th Ed., p. C-436, 1968.

Neumuller, *Rompps Chemie-Lexikon,* Franckh'she Verlagshandlung Stuttgart, Rickett, 2985, col. 1, 1972.

*BASF Manual of Textile Finishing,* Dec., 1972.

Kruger et al, *Melliand Textilberichte,* Heidelberg 5/1970, pp. 565-568.

Bille et al, *Melliand Textilberichte,* Heidelberg, Oct., 1970, pp. 1201-1202.

Bille et al, *Melliand Textilberichte,* Heidelberg, Feb., 1971, pp. 203-206.

Ralston, *Fatty Acids & Their Derivatives,* John Wiley & Sons, NY, 1948, pp. 119-131 and 438-443.

*GasChem Technical Bulletin* 100, Gas Chem, Inc, Bayonee, NJ, 1975.

*Einsele v. Uber du Flamfestausrustung von Textilin* R.T. 73, Textil—Praxis, vol. 27, No. 4 (Apr. 1972).

*Primary Examiner*—Maurice J. Welsh

*Attorney, Agent, or Firm*—Peter L. Berger

[57] ABSTRACT

This invention relates to a process for rendering non-thermoplastic fibers and fibrous compositions flame resistant when contacted with a hot molten material, that involves the application thereto of a flame retardant composition incorporating a water-insoluble, non-phosphorous, solid, particulate mixture of brominated organic compound and a metal oxide or a metal oxide and metal hydrate.

21 Claims, No Drawings

PROCESS FOR RENDERING NON-THERMOPLASTIC FIBROUS MATERIALS FLAME RESISTANT TO MOLTEN MATERIALS BY APPLICATION THERETO OF A FLAME RESISTANT COMPOSITION, AND RELATED ARTICLES AND COMPOSITIONS

CROSS REFERENCE TO RELATED APPLICATIONS

This application is a continuation application of my copending application Ser. No. 266,000 filed May 21, 1981, now U.S. Pat. No. 4,446,202; which is a continuation-in-part of application Ser. No. 31,307 filed Apr. 18, 1979 (now U.S. Pat. No. 4,348,306); which is a divisional of my copending application Ser. No. 797,767 filed May 17, 1977 (now U.S. Pat. No. 4,158,073); which is, in turn, a divisional of my then copending application Ser. No. 538,896 filed Jan. 6, 1975 (now abandoned); which latter application is, in turn, a divisional application of my then copending application Ser. No. 300,732 filed Oct. 25, 1972 (now abandoned); which latter application was related to, and incorporated application Ser. No. 300,731 filed Oct. 25, 1972 which issued as U.S. Pat. No. 3,877,974; and which together with U.S. Pat. No. 3,955,032; U.S. Pat. No. 4,113,902; U.S. Pat. No. 3,974,310; U.S. Pat. No. 4,129,798; and U.S. Pat. No. 4,158,077 are incorporated by reference herein.

TECHNICAL FIELD

This invention relates to flame retardant compositions, the textile fabrics treated with these compositions, and the processes for producing the foregoing compositions and fabrics.

BACKGROUND ART

Purely for safety purposes, flame retardants or flame resistance of a fabric is a highly desirble characteristic. Of many methods available for developing various levels of flame retardance all possess a variety of disadvantages, the principal ones being the inability of the flame retardant material, or treatment, to last through laundering or dry cleaning operations. Another principal disadvantage of treatment of fabrics to develop this characteristic of flame retardance is the loss of hand in the substrate. The problem is greatly aggravated in some areas of handling, particularly where it is necessary to meet regulatory, including statutory, requirements for flame retardance in garments. Their physical condition being in the form of a bundle of fine fibers invites and encourages the sustenance of a flame if one gets started in the fabric. That is, a large area of oxidation is presented to any flame which gets started.

Flame retardants for textiles and related materials of the durable type have been found to possess a multitude of side effects that would either render the flame retarded substrate unusable or reduce its useful life. In addition, most commonly used methods will be effective on one particular substrate while completely ineffective on others or blends of the same.

Flame retardant fabrics are worn by workers exposed to hot molten metals, glass and other compositions in the metals, glass and related industries and employed, for example, in steel mills, non-ferrous metal foundaries, welding and the like. Normally heretofore, the fabrics used in the manufacture of garments to be worn by workers in the metals industries are one hundred percent cotton and rendered flame retardant with phosphorus containing compositions, such as tetrakis hydroxymethyl phosphonium chloride, tetrakis hydroxymethyl phosphonium sulfate, and n-hydroxymethyl-3-(dimethylphosphono)propionamide (e.g. that sold under the trade name PYROVATEX CP by Ciba-Geigy Corporation).

It has been found, however, particularly where persons come into contact with non-ferrous metals in the molten state, such for example, as in non-ferrous metal foundaries, that the presence of the organo-phosphorus compounds on the fabric of workers' clothes causes or promotes adhesion of molten metals to the fabric. Due to the flame retardant character of the fabric effected by the presence of the organophosphorus flame retardant composition, the fabric does not usually ignite of burn when, by way of illustration, it is sprayed with molten metal or molten glass. The adhesion of the molten metal to the fabric results, however, in frequent material discomfort, in the form of severe burns and blisters.

It is, accordingly, a basic objective of this invention to provide a method employing familiar techniques in the textile industry for the application of flame retardant materials to textile fibers, whether the fibers be in the form of woven or non-woven cloth, knitted cloth or in the form of thread or fibers prior to being woven into the cloth.

It is a more particular object of this invention to provide flame retardant compositions for use in protective fabrics and fibrous compositions that will not only fail to ignite when brought into contact with hot, molten metals and materials including silicates of metals, such as glass, as for example, by splashing or spraying of the fabric with molten materials, but will not cause the molten metals to adhere to the fabric; and, indeed, will tend to repel the projected metal.

Other objects and advantages of the invention will be apparent from the description appearing hereinafter.

DISCLOSURE OF THE INVENTION

The present invention relates to a new method of flame retarding textile and related fibrous materials, such as plywood, using a commonly employed method in pigment printing and dyeing, that is, through the use of a primary binder which serves as an adhesive to fasten the flame retardant to a given substrate. In addition this technique can also be employed to flame retard the said binders, which normally are emulsions of synthetic polymeric materials which are highly flammable and contribute to the flammability of flame retarded substrates.

The subject of the present invention consists of two basic elements, the flame retardant element and a binding element.

More particularly, the compositions of the present invention comprise a flame retardant brominated compound dispersed in an aqueous medium and including for stability a surfactant or emulsifying agent and a protective colloid as a binder or thickening agent, together with a high molecular weight polymer, known to those skilled in the art to which this invention pertains, as a latex, that, in combination with the emulsion or dispersion, provides a composition having a viscosity which qualifies the resulting product as a latex as well; and which upon drying, either by heating or exposure to air at ambient temperatures will form a film. This film when produced on a textile fabric in accordance with the invention will tend to occlude the interstices between the fibers sufficiently to inhibit significantly the penetration into the fibers of particles of sprayed or splattered molten metal.

The flame retarding element or component is a normally and often desirably colorless highly brominated, or halobrominated, organic compound, solid at room temperature, possessing high melting and decomposition points, and which is easily reduced to a small particle size, and an extremely small particle size where desired, by conventional means of grinding. The solid flame retardant material is reduced to a micron, or where desired, a submicron, particle size and suspended in water in a fashion similar to the preparation of pigment dispersions. In some cases, especially when heat stable materials are used, a second component will contribute to render the brominated (or halobrominated) solids more heat unstable must be employed. This second component or synergist must possess similar characteristics to the brominated or halobrominated flame retardant, that is, it is a pulverized, or micropulverized, solid possessing good heat stability, finely dispersed in water. In addition, it must react with the brominated, or halobrominated, flame retardant or retarder at combustion temperatures to form a gaseous non-flammable gas which will prevent oxygen from reaching the flaming, or flammable substrate, thus impeding the oxidation process. This additive, actually deemed to be essential in accordance with the particular inventive features described herein where the latexes are to be used in protection of fabrics from molten metals, is a metallic oxide, as further characterized hereinafter. Also present, as indicated heretofore, is an aqueous medium and, to afford stability, a surfactant, and preferably a nonionic or anionic surface active agent. The flame retardant component or "first element" of the compositions of the invention is thus an emulsion or dispersion of brominated organic compound and metallic oxide in water stabilized with a wetting agent.

The "second" element or component used in this invention is an emulsion of a high molecular weight polymer or aqueous emulsion polymer commonly referred to as a latex.

Due to the fact that the latexes or latices possess extremely good adhesive properties, they are normally used for bonding purposes. At the same time in the finished state when they are dried and adhering to the fabric to which they are applied, these latexes, when incorporating the flame-retardant emulsions described herein, unlike the commonly employed organophosphorous compounds referred to heretofore, do not hold or cause the molten metals, molten glass and related elements, alloys and compositions to adhere thereto. These latexes are used for bonding of pigments to difficultly dye substrates, to bond fibers with fibers, to obtain non-woven fabrics, to bond fibers to fabrics to produce flocked fabrics, and to bond fabrics to fabrics, fabrics to foams, fabrics to films, non-wovens, etc. to obtain laminated fabrics. They are also used for fabric backcoating to achieve various effects such as dimensional stability, to prevent ravelling, to give fabrics non-slipping characteristics with a filler, to impact opacity to the same, etc., and for finishing to achieve dimensional stability, to increase strength, decrease air permeability, impart waste and water repellency, etc.

This invention, in one embodiment, then relates to two uses of these materials:

a. to bond the flame retardant to non-reactive substrates by the use of latex adhesives; and b. to use the flame retardant to make the latex films non-combustible or self-extinguishing when they are applied to flame retardaned substrates.

In a particularly significant embodiment of the present invention a third aspect in the use of these latexes has a special relevance, and that is:

c. to provide a film which covers the fabric fibers; and while permitting passage of air through the interstices between the individual fibers, will partially occlude these passages and provide a hard, impervious coat to the fibers and resulting fabric sufficient to repel molten metals, glass, and other molten elements, alloys, compounds and compositions especially in a particulate form.

BEST MODE FOR CARRYING OUT THE INVENTION

In accordance with the present invention there is provided a non-adhesive, film-forming latex composition comprising a flame-retardant, and more particularly a brominated organic compound in particulate form dispersed in an aqueous medium in which the dispersed phase is maintained in a significantly preferred embodiment by use of a nonionic or anionic surfactant or emulsifier, or mixtures thereof. The foregoing components are dispersed in an aqueous emulsion polymer that upon drying forms a flame resistant fabric to which hot molten metals and materials will not adhere. The term "hot" is employed herein to indicate materials having an elevated temperature sufficient to cause discomfort, pain, burns, lesions or the like to the integument or covering of living organisms and particularly the skin, hair and the like of humans and other mammals.

The pulverized or micropulverized solid brominated organic flame retardant is first dispersed in water containing a wetting agent by adding it slowly to the aqueous phase under strong agitation with a high speed, high shear mixture. After addition of the solid has been completed, the resulting dispersion is stabilized by adding small quantities of a protective colloid (commonly also called a thickener), such as carboxy methyl cellulose, or methoxy, or ethoxy, cellulose of selected molecular weight to achieve an optimum viscosity and further prevent the particles from settling.

The protective colloid is included as an optional component and may be added, illustratively, before or after addition of the latex. It is incorporated for the purpose of facilitating conventional printing and coating steps in which the compositions of the invention are included.

The viscosity achieved upon dilution with water and addition of latex is normally within the range of about 1800 centipoises (cps) to about 2500 cps and more desirably from 1000 cps to 2200 cps with a particularly preferred upper limit of about 2000–2200 cps where the ultimate composition is to be applied to fabric for protection against molten compositions, including metals, in particulate form. No less than 1800 cps is preferred for shelf-life. The FR (flame retardant 2200) composition so prepared is now diluted with water to a predetermined strength and sufficient latex is added to achieve adhesion and is usually and preferably that secured upon incorporation of the protective colloid; the upper end of the range providing a more effective and thicker coating or film when the composition is applied to a fabric, the lower end of the range yielding a lighter, more flexible and porous fabric but one still effectively protected against particulate molten metal although less so than where a higher viscosity latex is employed.

The latexes or dispersions of the invention have been found to have particular utility as non-adhesive, molten, non-ferrous metal repellant and flame retardant compositions for application to fabrics used in protective clothing, including welders' skirts and curtains to be worn or used in the presence of molten forms of aluminum, nickel, copper, zinc, lead, magnesium, and alloys such as bronze, brass and the like, which are normally solid at ambient temperatures. The latexes and dispersions impart a repellancy to molten metal in conjunction with a temperature resistivity that protects the human skin, for example, from discomfort and injury. These latexes or dispersions are also useful with additional high melting compositions and materials in hot molten form such as steel and iron, and including glass, ceramic compositions, thermoplastic polymers and polymeric formulations and the like where the unique non-adhesive character of the compositions of the invention has not been a matter of concern heretofore.

The resulting dispersion or latex is now applied to the fabric substrate in a convenient embodiment by dipping of the substrate into the dispersion with removal of the excess therefrom by squeeze rolls, i.e. squeezing between two rollers. The wet substrate with excess latex dispersion removed is now air dried at any convenient temperature, for example, 70° C. to 150° C., and most desirably in terms of efficient operation, at about 125° C. to about 150° C. for a period of about 180 seconds to 90 seconds respectively.

The resulting material, a film coated fabric substrate, is flame retardant when tested by commonly used flammability tests and the flame retardant is not lost after multiple launderings and/or dry cleanings. This result is secured particularly where a significantly reduced particulate brominated organic compound and metallic oxide are incorporated in the latex composition of the invention. The feel or hand of the flame retarded material is unchanted, but can be made stiffer, if desirable to do so, by, for example, selecting a harder latex.

Thus the FR or flame retardant, non-adhesive, thermal moderating dispersion prepared as described above, is diluted in water, the latex is added and the viscosity adjusted by the use of a thickener, if desired.

This treating batch is applied by different techniques depending on the final effect desired. It can be padded, knife coated, roller coated, sprayed, roller printed, screen printed, applied by saturation and the like. The substrates are now air dried at any convenient temperature, and baked as above.

This technique is usually employed when the substrate to which the latex is applied is either intrinsically flame retardant or has been flame proofed in a separate operation. It can be used to flame retard latexes or latices, which will be employed as flocking adhesives, for fabric backcoating, pigment dyeing or printing, bonding or non-woven fabric lamination and the like.

The process of this invention is applicable to nonthermoplastic textile materials, in staple, tow, yarn fiber, woven fabrics, non-woven fabrics, circular and flat knits, and the like, and to paper and the like.

The substrates of choice for use with the latex of the invention in preparation of a flame retardant fabric for use in protective clothing resistant to attack by hot molten materials, and particularly non-ferrous metals is a cellulose, and particularly the naturally occurring cellulosic fiber and fabric, cotton. Other useful cellulose fibers and fabrics include linen, jute, coca fiber and rayon. Naturally occurring polypeptides or proteinaceous fibers and fabrics, such as wool and silk, are also useful for this purpose, and preferred for some applications. In any event, thermoplastic resinous substrates including synthetic fabrics such as polyamides and polyesters are to be avoided in this application.

Where, however, flame retardancy is an objective but does not involve repellency or flame retardancy to hot molten non-ferrous metals, the variety of substrates to which the latex is usually applied is much broader and includes man-made fabrics from fibers such as regenerated cellulose, cellulose di-, and tri-, acetates, fiberglass, and the like, or synthetic polymer materials such as nylon, polyester, acrylics, polypropylene, blends of the foregoing and the like.

The brominated organic compounds for use herein include substituted and unsubstituted brominated aromatic and saturated and unsaturated cycloaliphatic phenols, ethers, esters, amines, hydrocarbons and the like.

The preferred aromatic flame retarding materials or compounds of the invention are further illustrated as follows:

The present invention utilizes brominated aromatic and cycloaliphatic compounmds, preferably brominated as flame retarding materials, The preferred aromatic compounds employed are as follows:

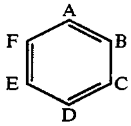
BENZENE
I

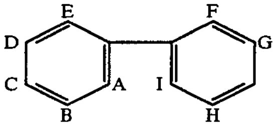
BIPHENYL
II

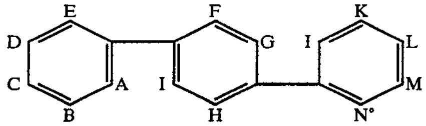
TERPHENYL
III

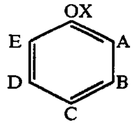
PHENOL
IV

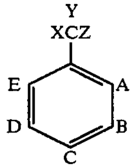
TOLUENE
V

-continued

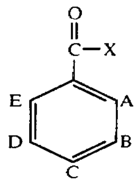

BENZOIC ACID
VI

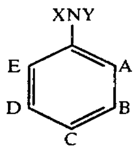

ANILINE
VII

Where A through N° are the same or different and can be H, Br, $CH_3$, $C_2H_5$, $C_3H_7$,

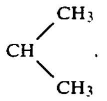

$C_4H_9$ and the like; and X, Y, Z can be the same or different and can be H. $CH_3$, $C_2H_5$, $C_3H_7$, $C_6H_5$, and the like and at least one of A to N° is bromine; and wherein M' is the same or different and is H or K.

Aliphatic cyclic compounds of the nature:

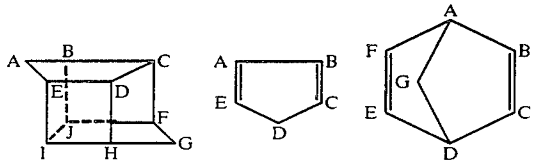

wherein A to I have the values assigned above;

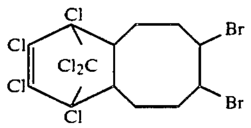

Dibromohexachlorocyclopentadienocyclooctane

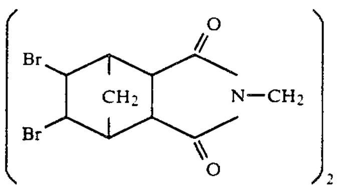

$N^1$—ethylbis)dibromonorbornane dicarboximide

The preferred entities are:

1. Polybrominated benzenes of the general formula:

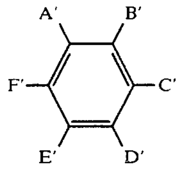

where A' to F' are the same or different and may be H or Br, with at least one bromine substituent present on the benzene ring.

2. Bromo (e.g. polybromo) monoalkyl benzenes of the general formula

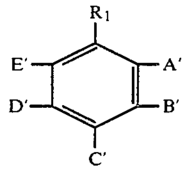

where $R_1$ may be an alkyl, of preferably 1-5 carbons, such as methyl, ethyl, propyl, butyl, pentyl, isopropyl, term. butyl; an unsaturated alkyl containing preferably 1 to 5 carbon atoms; haloalkyl or polyhaloalkyl wherein the alkyl moiety may include preferably, 1 to 5 carbon atoms and wherein the halogens are bromine e.g. 1 to 4 alone or in combination with one or more halogens such as chlorine; aryl (e.g. phenyl); halomoaryl (e.g. bromophenyl); polyhalophenyl) wherein said haloaryl and polyhalo aryl substituent is present the halogen substituent or substituents is preferably bromine; and A', B', C', D', E', are as defined in numbered paragraph 1 immediately preceding; provided that at least one, and preferably at least two, bromine substituents are present in the molecule.

3. Bromo (e.g. polybromo) dialkyl benzene of the general formula:

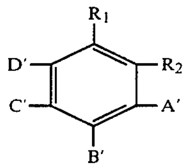

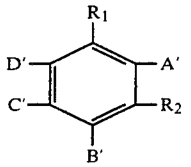

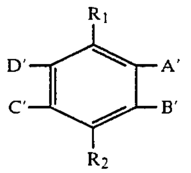

where $R_1$ and $R_2$ are the same or different and are the same as $R_1$ in numbered paragraph 2 immediately preceding, and A' to D' have the same values assigned therein, and provided at least one bromine substituent and preferably a plurality e.g. up to six bromine atoms are present.

4. Brominated (e.g. polybrominated) phenols or diaryl (e.g. diphenyl) oxides the general formula:

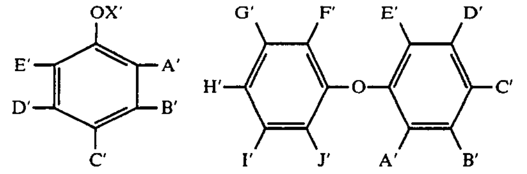

(phenols) (oxides)

wherein X′ is H, $R_1$, $$\overset{O}{\overset{\|}{C}}R_1,\ (\overset{H}{C}=\overset{H}{C})\ C_nH_{2n+1},$$

n is 1 to 4, $C_6H_5$, brominated derivatives thereof, e.g. $Br_5C_6H_5$, Cl or Br; A′ to J′ have the values assigned in paragraph 1 hereof with respect to A′ to F′.

$$\overset{O}{\overset{\|}{C}}-M'$$

wherein M′ is hydrogen or potassium.

5. Brominated (e.g. polybrominated) biphenyls of the general formula:

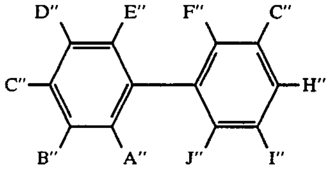

where A″ to J″ are the same or different and are H, Br, lower alkyl $C_1$ to $C_5$, aryl, $$\overset{O}{\overset{\|}{C}}-M',$$

M′ being K or H and the like; and at least one of the substituents, and preferably two or more, is bromine.

6. Brominated (e.g. polybrominated) terphenyls of the general formula:

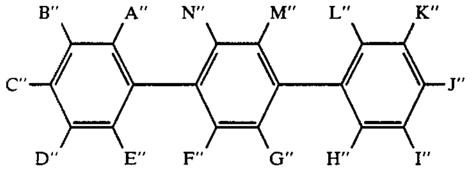

wherein A″ to N″ have the values assigned to A″ to J″ in numbered paragraphs 5 hereof; and one, and preferably at least two of A″ to J″ is bromine.

7. Brominated, (e.g. polybrominated) aniline of the general formula:

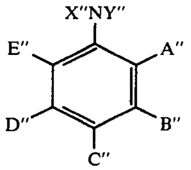

where A″ to E″ have the values assigned to A″ to N″ in numbered paragraphs 6 immediately preceding, and X″ and Y″ are H, lower alkyl $C_1$ to $C_5$, aryl, bromoalkyl, polybromoalkyl, bromoaryl, polybromoaryl, phenyl, bromophenyl, polybromophenyl and the like; and said ancline incorproates at least one bromine substituent, and preferably at least two such substituents.

8. Brominated (e.g. polybrominated) aromatic mono and polyacids, anhydrides or esters of the same of the general formula:

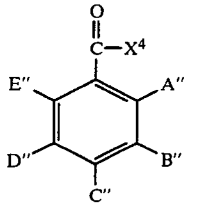
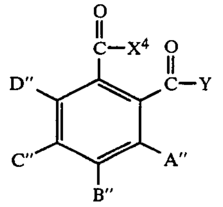

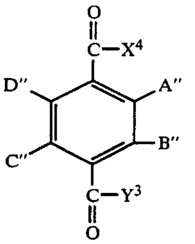
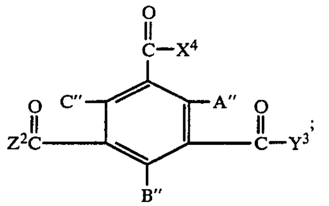;

wherein A″ to E″ have the values assigned in numbered paragraph 5 hereinabove; and each of $X^4$, $Y^3$ and Z″ has the value assigned to $R^3$ in numbered paragraph 4 hereinabove; wherein at least one and preferably two of the foregoing substituents which may be bromine is a bromine substituent; and 2. Brominated (e.g. polybrominated)bisphenol A or S (a brominated derivative, for example, of 4,4′-(1-methylethylidene)bisphenol, and illustratively of the general formula:

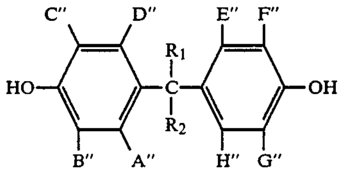

wherein the above formula A″ to H″ have the values assigned in numbered paragraph 5 hereinabove; and $R_1$ and $R_2$ have the values assigned in numbered paragraph 3 above.

The brominated compounds of particular utility and preferred in the practice of the invention for incorporation in molten metal flame retardant fabrics are polybrominated diphenyl oxide e.g. decabromodiphenyl oxide, polybrominated biphenyl or diphenyl e.g. decabromodiphenyl; polybrominated cycloalkanes and most desirably polybrominated cyclohexane e.g. hexabromocyclohexane or polybrominated cyclododecane e.g. hexabromocyclododecane, and, more particularly, 1, 2, 5, 6, 9, 10-hexabromocyclododecane, (polybrominated cyclopentane, polybrominated cyclooctane, and polybrominated cyclodecane are also useful); polybrominated bisphenols, e.g. tetrabromo bisphenol A or tetrabromo bisphenol S; N, N'-alkyl bis (polybrominated nonbornene) dicarboximide, e.g. N,N'-ethyl bis (dibromo nonbornene) dicarboximide and other polybrominated derivatives thereof, and polyhalogenated cyclopentadieno-polybrominated cycloalkanes e.g. hexachlorocyclopentadieno-dibromocyclooctane and other polychloro and polybrominated derivatives thereof.

It will be apparent from the description appearing elsewhere herein that those flame retardant compounds containing phosphorous are expressly excluded from use in the dispersions or latices of the invention for application to fiber-containing fabrics such as cotton and wool to be rendered flame retardant to molten non-ferrous metals, especially in particulate form, because of their propensity for causing adhesion of molten non-ferrous metallic elements, alloys, compounds and compositions. The latices of the invention are of significant utility with ferrous metals such as in steel mills, as well, but adhesion has not presented a material problem in this case.

In the process of preparing the flame proofing agents of the present invention there is also utilized a compound or composition which reacts with the brominated or halobrominated organic material at the flame temperatures inducing its decomposition and liberating a non-flammable gas which forms a blanket around the flaming substrate, displacing the oxygen from the vicinity of the same thus impeding the oxidation process of combustion.

This second component or composition is a metallic oxide of the general formula:

$$Me_2O_n$$

wherein, Me is aluminum, silicon, arsenic, bismuth, titanium, zironium or molybdenun and the like, and particularly and most desirably, antimony; and n is the valence of the metal. Other especially useful oxides are the oxides of aluminum, tin, and arsenic.

The preferred antimony oxide ($Sb_2O_3$) employed in achieving the uniquely fire-retardant compositions of the invention occurs in crystalline form principally as senarmontite, but also as valentinite. Normally, these crystalline forms occur in admixture with amounts by weight of about 5 percent of the latter present. The typical antimony oxide compositions employed contain at least 99 percent of $Sb_2O_3$, the remainder, constituting usually lead, arsenic, iron, nickel, copper and sulfate. The oxide, $Sb_2O_5$, is also useful in the practice of the invention.

A third component for use herein is a metallic hydrate, particularly hydrated alumina in which a substantial quantity of heat is absorbed upon thermal decomposition of the hydrate and is thus characterized by possession of a water of crystallinity which in the course of thermal dehydration thereof results in the absorption of at least 300, and preferably up to 400, calories per gram of hydrate. In addition, the foregoing hydrated alumina contains a refractory oxide of the metal in an amount of more than about 60 percent by weight and having an atomic number less than 14. Trace or residual amounts of $SiO_2$, $Fe_2O_3$ and $Na_2O$, usually not in excess of about 3 percent by weight of the total composition of the alumina trihydrate, and often substantially less, are also present.

Particularly preferred in the practice of the present invention is alumina trihydrate having a median particle size generally, and in a significantly preferred embodiment, within the range of from about 0.5 to 5 microns and in any event not in excess of about 20 microns. Alumina trihydrate within this particle size range is readily available commercially. The density of the alumina trihydrate for use herein is usually within the range of 2,000 grams per liter to 3,000 grams per liter, and where alpha alumina trihydrate is employed the density of the material is normally about 2,420 grams per liter.

Mixtures of antimony oxide and a hydrated alumina are also usefully employed in the practice of the invention.

The foregoing additives or synergists, the metallic oxide and preferably the hydrate, are in any event, blended with the brominated or halobrominated compound during the preparation of the FR dispersions, the ratio of brominated or halobrominated compound to additives depending on the stability of the brominated or halobrominated material and the reactivity of the particular metallic oxide employed. It was found that normally about 1 to about 5 parts by weight of brominated of halobrominated flame retarder for each part of metallic oxide, preferably 1-3 parts to 1 part, gives the best results. In addition, up to about 30 parts, and preferably 10 to 20 parts of hydrated alumina is utilized.

The surfactants employed in forming the dispersions of the invention include, as indicated, nonionic surface active agents such as the ethoxylated derivatives of adducts of alkyl substituted phenols containing, illustratively, from 7 to 12 carbon atoms, such as nonyl phenol; and adducts containing from 1 to 20 or more moles of ethylene oxide per mol of phenol, or polyoxypropylene-polyoxy-ethylene copolymers (PLURONIC polyols).

Illustrative anionic surfactants useful in the practice of the invention incude the alkali metal sulfates of long chain fatty acids e.g. those containing 7 to 16 carbon atoms, such as sodium lauryl sulfate, and sodium myristyl sulfate. Combinations of nonionic and anionic surfactants may also be employed.

The thickening agents or protective colloids, include, as indicated elsewhere herein, a carboxy methyl cellulose, methoxy, or ethoxy, cellulose having a viscosity, desirably, of from 500 cps to about 25,000 cps, and preferably from 750 cps to 15,000 cps.

The polymer employed can be the result of polymerizing acrylic acid, acrylonitrile, methacrylic acid, acrylamide, methacrylic acid, acrylic and methacrylic acid esters, vinyl chloride, vinyl esters such as vinyl acetate, and vinyl copolymers, vinylidene chloride, styrene, butadiene, maleic or fumaric acids and esters of the same and the like. The polymer can be a homopolymer or copolymer of the above described monomers. These emulsion polymers are commercially available in differing grades depending on the ultimate properties desired. They have in common the fact that they form films at room or elevated temperatures, alone or in the presence of plasticizers. The properties of the film depend on the chemical composition of the same.

The emulsion polymers, commonly referred to as synthetic latexes or latices, are commercially available materials, obtained by emulsion homo- or co-polymerization of monomers of the general class:

$$R_1-\overset{H}{C}=\overset{H}{C}-R_2$$

where $R_1$ and $R_2$ can be the same or different and can be selected among H, Cl, Br, $CH_3$, $C_nH_m$ where n is 1 to 5 and $m=2n+1$, COOH, $CONH_2$, CN, $CH=CH_2$, $C_6H_3$ and the like.

The preferred monomers are alkyl esters of acrylic and methacrylic acids, acryl/and methacryl amides, acrylonitrile, acrylic and methacrylic acids, maleic or fumaric acids and alkyl esters of the same, vinyl and vinylidene chlorides, styrene and butadiene.

Due to the infinite number of possible combinations the polymers are classed in the following groups:

a. Acrylic latices, mainly homo- or co-polymers of alkyl esters of acrylic or methacrylic acids which can also contain acrylic or methacrylic acid, acrylonitrile, acrylamide, n-methylol acrylamide, vinyl and vinylidiene chlorides and the like. The alkyl group of the esters can also contain hydroxyl groups. The presence of reactive groups, such as HO, $CONH_2$, COOH, $NHCH_2OH$, suggests the possibility of further crosslinkage by the effect of heat leading to a higher molecular weight and thus much more stable polymers. These types of polymers are referred to as cross-linking, self-cross linking or thermosetting latices.

b. Acrylonitrile latices: where the major ingredient is acrylonitrile which can be found as homo polymers or copolymers as in (a).

c. Vinylchloride latices: where the major constituent is this monomer homo-polymerized or copolymerized as in (a).

d. Vinylidine chloride latices:

e. ABS (acrylonitrile-butadiene-styrene) latices: where these three monomers are the principal ingredients and can also be copolymerized with other monomers as in (a).

f. SBR (styrene-butadiene-rubber) latices.

g. Also these are employed emulsion polymers obtained by the reaction of a polyisocyanate and an aliphatic polyol which can be a polyether, a polyester, or a polycaprolactone, the preferred polyisocyanate and an aliphatic polyol which can be a polyether, a polyester, or a polycaprolactone, the preferred polyisocyanate being a mixture of isomers of toluene diisocyanate and the preferred polyol being a polyethylene glycol condensate having a molecular weight in excess of 3,000, commonly referred to as a polyurethane latex.

The reason for blending these various monomers is to achieve polymers with varying film properties, such as:

1. Feel or hand of film. This can vary from soft to hard and from tacky to dry. This parameter is measured by the glass transition temperature (T.G.) or in some cases by $T_{300}$ (temperature at which the torsional modulus of an air dried film is 300 kg/cm$^2$). Both are measured in °C. and can range from $-100°$ C. to $+100°$ C. As a general rule, the lower the TG or $T_{300}$ the softer the film, the film becoming harder when increasing temperatures.

2. Solvent swelling resistance. Latices are known to swell when wetted with organic, especially chlorinated solvents, resulting in lack of durability to dry cleaning. This property is improved by introducing cross-linkable sites into the molecule of the polymer.

3. Film strength. The strength of the film is also improved by increasing the molecular weight of the polymer through the introduction of crosslinkable sites which are made to react by heat and/or catalysts.

4. Adhesion of film. This property is very important since the durability of the flame retarder will greatly depend on it.

The particle size of the brominated, including halobrominated, organic compound in the latex is of particular significance in the advantages derived in terms of flame retardancy and durability. The increased durability to washing in contrast with liquid flame retardants, such as tris-dibromopropyl phosphate, available in a self-emulsifiable form as a fifty percent product in one or more solvent containing emulsifiers is a reflection of the solid, particulate flame retardant has thus manifested an unexpectedly effective durability and flame retardancy in the practice of the invention when employed in an average particle size of up to about or precisely 10 microns and, though significantly less preferred, up to about 20 microns, and particularly in a range of up to 2 microns, and desirably 0.25 to 2 microns. It has been discovered, additionally, in the treatment of fibrous substrates such as the cellulosic and protein or polypeptide substrates described elsewhere herein, and particularly cotton and wool, that the utilization of a brominated flame retardant having an average particle size of about 0.25 microns to about 20 microns, and a significantly preferred average particle size not exceeding 10 microns, results in a fabric having an effective flame retardance in the presence of hot molten substances, and particularly, molten non-ferrous metals, with adhesion of the metal to the impregnated and coated fabric substantially eliminated where clothing is made of the treated fabric and subject to even the most arduous and continuous exposure to, and contact with, a molten metal. At the same time, the utilization of non-thermoplastic fiber-containing fabrics avoids the melting of fabrics particularly into and onto the skin of any fabric user.

The metal oxide, for example $Sb_2O_3$ or $Sb_2O_5$, is also present in the latex in particulate, water insoluble form and is pulverized where necessary to an average particle size no longer than that of the brominated organic flame retardant or are present in a smaller particle size. The average particle size used is normally from about 0.5 microns to about 2.0 microns. Larger or small particle sizes may be used, however, so long as they do not exceed about 20 microns and preferably about or precisely 10 microns, or, as indicated, the size of the brominated organic compound utilized.

To avoid the presence of coalesced particles or particles of large and disparate size, either metallic oxide brominated organic compound, or metal hydrate, all components are passed through a sleeve, preferably, having illustratively, a United States Standard sieve size of aobug 200.

In the process of preparing the flame retardant dispersion, illustratively, 1 to 4 parts, and preferably 1 to 2 parts, of a finely divided powdered brominated or halobrominated organic material is dispersed in 1 part of water containing 0.1 to 1% of anionic or nonionic wetting agent by the use of a high shear mixer. After addition is completed 0.1 to 1 part, preferably 0.4 to 0.6 part, based on the weight of the brominated or halobrominated organic compound, of a metallic oxide is slowly added and 5 to 10 parts of alumina hydrate is optionally incorporated as well. After addition is complete the dispersion is stabilized by adding 0.1 to 0.5%, preferably 0.2 to 0.3%, based on the weight of the dispersion of a protective colloid such as ethoxy cellulose.

In the case where it is necessary to flame retard a given substrate, 0.5 to 1.5 parts, preferably 0.8 to 1.2 parts, of FR dispersion are dissolved in 1 part of water with mild agitation. To this solution, 0.2 to 0.6, preferably 0.8 to 0.5, part of a latex containing 35 to 65%, preferably 45 to 55%, of a polymer is added. In treating hydrophobic substrates, 0.1% to 0.5%, preferably 0.2% to 0.4% of a wetting agent is added.

The substrate to be treated is dipped in this solution and the excess removed by squeezing between two rollers. The wet material is air dried in an oven at 80° C. to 130° C., preferably 100° C. to 110° C., and baked at 140° C. to 180° C., and preferably 150° C. to 170° C., for ½ to 5 minutes, and preferably 1½ to 3 minutes.

When the substrate to be treated is either intrinsically flame resistant or has been flame retarded in a separate operation and must be treated with a flammable latex to achieve some desirable effect on the substrate the treating solution is prepared as follows: to 1 part of water 0.5 to 1.5 parts, preferably 0.8 to 1.2 parts, of latex is added, and the solution is mixed until uniform. To 0.2 to 0.6 part, preferably 0.3 to 0.5 part, based on the weight of the latex, of FR dispersions is added and mixed to uniformity. At this point any other needed auxiliaries, such as pigments, thickeners, fillers, plasticizers, wetting agents, catalysts, and the like, are incorporated in any required proportion and the solution mixed.

The treating solution is now applied to the flame resistant substrate by any convenient way, such as padding, coating, printing, saturation and the like and the wet goods are dried and baked as above.

The average particle size of the brominated organic flame retardant compounds and metallic oxides and metallic hydrates employed herein is expressed in statistical terms and includes a screening of these particulate components to eliminate particles that will not pass through a 200 mesh screen. Measurement determinations are made conveniently either in a Colter counter, a Fisher counter, or employing a microscopic measurement. Sedimentation rates are also employed sometimes. The techniques employed are well-known to those skilled in the art and the microscopic means of determination is preferred and is that employed herein unless otherwise specifically indicated.

The following examples are further illustrative of the invention. In these examples as in the description otherwise appearing herein, all parts and percentages are by weight of the total composition unless and to the extent expressly indicated.

EXAMPLE I

Seventy parts of finely divided hexabromo benzene having an average particle size between 1 and 2 microns were dispersed slowly into 50 parts of water containing 0.2% anionic wetting agent of the alkyl-aryl sulfonate type under strong agitation with a high speed, high shear mixer. After completing the addition of the brominated compound 12 parts of finely divided antimony trioxide possessing an average particle size between 1 and 2 microns and 15 parts of aluminum oxide were slowly added while agitation was continued. After all the antimony trioxide was added the resulting milky white dispersion was stabilized by addition of 5 parts of a 4% aqueous solution, having a viscosity of 300,000 centipoises, of ethoxy cellulose. This dispersion, thus obtained, remained uniform after prolonged storage at room temperature and was designated dispersion I.

40 parts of dispersion I were admixed in 52 parts of water, and 8 parts of a 50 percent emulsion of a styrene butadiene copolymer having a glass transition temperature of −80° C. were added.

A piece of 100% cotton circular knit weighing 8 ozs./yd$^2$ was immersed in this dispersion and the excess removed by squeezing between two rollers. The wet pick up was 120% and the fabric was dried at 110° C. and baked at 150° C. for 3 minutes. The fabric was softened by padding through a 10% emulsion of a polyethylene softener and dried.

The fabric was judged flame retardant by using the method outlined in DDC FF3-71, giving an initial average char length of 1 inch and 2½ inches after 50 launderings and tumble dryings.

EXAMPLE II

The process of Example I is repeated except that aluminum oxide is omitted from the preparation of the dispersion.

EXAMPLE III

The process of Example II is repeated except that titanium dioxide is substituted for antimony oxide, and 70 parts of decabromodiphenyl oxide having a particle size of between 1 to 2 microns is dispersed in 40 parts of water.

EXAMPLE IV

To 32.5 parts of a solution containing 1 part of the nonionic wetting agent, polyoxyethylene stearate, and 0.5 parts of the thickener or protective colloid carboxymethyl cellulose in 32 parts of tap water is added 45 parts of the solid, particulate water-insoluble brominated organic compound, hexabromocyclododecane having an average particle size, after passage through a sieve having a U.S. standard sieve size of 200, of about 20 microns. To this dispersion is added 22.5 parts of the metallic oxide $Sb_2O_3$, with continuous agitation. Agitation is continued until a homogeneous white paste results. Twenty to sixty parts of this paste or dispersion is admixed with 10–40 parts of an aqueous emulsion incorporating an emulsion polymer adhesive binder, styrene butadiene copolymer having a viscosity of 10,000 cps, and sufficient water to provide a latex totalling 100 parts. A piece of 100% of cotton fabric is then treated with the foregoing latex by padding to obtain a wet pick-up of from 50% to 150% of the fabric weight of the treated fabric which is then dried to eliminate the water and baked to set the polymeric adhesive.

EXAMPLE V

The procedure of Example IV is repeated substituting decabromodiphenyl oxide (for hexabromo cyclododecane) having a particle size of about 2 microns average diameter and a butyl acrylate copolymer latex for the styrene-butadiene copolymer of Example IV with admixture of the components in the amount recited hereinbelow.

The initial dispersion, dispersion V is thus composed as follows:

| | |
|---|---|
| Water | 32 parts |
| Nonionic wetting agent | 1 part |
| ethoxylated nonyl phenol | 1 part |

-continued

| | |
|---|---|
| Thickener-hydroxyethyl cellulose | 0.5 part |
| Decabromodiphenyl oxide | 45 parts |
| Antimony trioxide | 22.5 parts |

Dispersion V, in a percentage by weight of 45 percent, is then admixed with water in an amount by weight of 32.5 percent and the butyl acrylate copolymer latex referred to hereinabove, in an amount by weight of 22.5 percent. A 10 oz/yd$^2$ 100 percent cotton fabric is then immersed in this latter dispersion of latex to effect saturation of the fabric and the excess removed by squeezing between a pair of squeeze rollers. The wet pick-up is about 110 percent and the fabric is dried at 110° C. and thereafter baked at 150° C. for three minutes.

The fabric thus treated is tested using the "Molten Material Splash Test" as described hereinafter with aluminum, lead, zinc, copper, brass and glass and manifests no sticking ("none") or burning of the treated fabric as characterized in the test description.

A piece of the treated sample is laundered and tumble dried 50 times using a home washer and drier and retested with the "Molten Material Splash Test" and again no sticking of the molten metal is observed.

The Molten Material Splash Test employed herein is conducted by placing a rectangular piece of fabric measuring 24 inches by 48 inches on a suitable supporting frame in such a manner that the fabric is retained securely at an angle of from 45 to 60 degrees from the horizontal. An arbitrary amount of the material to be tested is melted in a crucible by placing it into a muffle furnace. The material when entirely liquid is removed from the furnace and poured immediately from the crucible onto the top portion of the fabric. The molten material is permitted to run off the fabric into a ceramic container placed under the lower edge of the fabric and frame. The sticking or adhesion of the molten material, e.g. the non-ferrous metals, to fabric treated with the flame retardant-containing the latex of this example is measured using the following scale in which the standards recited are those based on the frequency of presence of metallic residues: (1) none; (2) mild; (3) intermediate; (4) extensive; and (5) severe. While the test samples coming within the measurement standards 2 to 4 do not appear in this example, they are contemplated as intermediate standards between visible adhesion of the material, such as non-ferrous metal or glass to the entire surface of the tested fabric (the "severe" characterization of Test Measurement No. 5) and no visible adhesion at all (the "none" of Test Measurement No. 1).

The same fabric with no flame retardant treatment when tested in a similar fashion ignites and is entirely consumed by the flame.

EXAMPLE VI

The dispersion of Example IV is prepared using pentabromotoluene as the brominated organic compound $Al_2O_c.3H_2O$ (Alumina trihydrate) together with antimony oxide. This dispersion is designated as Dispersion VI.

A paste is prepared by mixing:

| | % By Weight |
|---|---|
| Dispersion X | 60 |
| 50% Polyvinyl chloride latex | 35 |
| Hydroxyethyl cellulose thickener | 5 (viscosity 2000 cps) |

This paste is coated on a sample of 100% cotton denim, weighing 14 ozs/yd$^2$, using a doctor blade. Wet pick-up was 60% and the fabric is dried at 110° C. and baked at 150° C. for three minutes.

The treated sample is tested using the Molten Material or Metal Splash Test initially and after 50 launderings and tumble dryings with no visible sticking ("none" in accordance with the test standard) of the molten materials in any of the specimens tested.

EXAMPLES VII-XI

A series of brominated organic compounds, metallic oxides and latexes are admixed and evaluated in Examples VII to XI in a manner similar to that of Example V. The components of these several examples are described in the table given below:

| Ex. | Organic Brominated Compound | Metallic Oxide | 50% Emulsion Polymer Latex |
|---|---|---|---|
| VII | Decabromobiphenyl | $As_2O_3$ | Styrene/butadiene copolymer |
| VIII | Octabromodiphenyl Oxide | $Sb_2O_5$ | Polyvinyl acetate |
| IX | Hexabromobenzene | $SiO_2$ | Polyvinyl chloride |
| X | Hexabromo cyclohexane | $Sb_2O_3$ | Polytoluene disocyanate |
| XI | Hexabromo cyclododecane | $Al_2O_3.3H_2O$ | Polyacrylonitrile |

Dispersions of all the above materials are padded onto an 8 oz/yd$^2$ fabric, dried and cured. These samples are tested using the hot Molten Material Splash Test initially and after 50 launderings with no apparent sticking ("none") of any of the metals, i.e. aluminum, lead, zinc, copper, brass and glass, tested.

When known phorphorus-containing flame retardant compositions are substituted for the non-phosphorus containing brominated organic flame retardants of the present invention in the molten splash test, severe adhesion (Test Measurement No. 5) occurred in every instance.

While polybrominated diphenyl oxides are preferred, and decabromodiphenyl oxide is significantly preferred, in the practice of the invention, using techniques and formulations of Examples I to XI the following compounds may also be used desirably for application to the various bases identified in the several examples:

| | |
|---|---|
| Polybrominated biphenyl | hexabromo |
| Polybrominated benzene | hexabromo |
| Polybrominated toluene | pentabromo toluene |
| Polybrominated chlorotoluene | tetrabromo |
| Polybrominated phenol | pentabromo phenol |
| Polybrominated aniline | tribromo aniline |
| Polybrominated benzoic acid | dibromo benzoic acid |
| Polybrominated cyclopentane | tetrabromo cyclo |
| Polybrominated cyclohexane | hexabromo cyclo |
| Polybrominated cyclooctane | hexabromo cyclo |
| Polybrominated cyclodecane | hexabromo cyclo |
| Polybrominated cyclododecane | hexabromo cyclo |
| Hexachlorocyclopentadieno dibromocyclooctane | |
| N, N'—ethyl-bis | |

-continued

| |
|---|
| (dibromo-norbornene-dicarboximide) |

It will be evident, that the terms and expressions which have been employed herein are used as terms of description and not of limitation. There is no intention in the use of such terms and expressions of excluding equivalents of the features shown and described or portions thereof, and it is recognized that various modifications are possible within the scope of the invention claimed.

What is claimed is:

1. A process for rendering a non-thermoplastic fiber, fabric, or fibrous composition flame resistant when contacted with a hot molten material, that comprises applying to said fiber, fabric or fibrous composition, a flame retardant composition comprising a water-insoluble, non-phosphorous containing brominated aromatic or cycloaliphatic organic compound and a metal oxide, or mixtures of said oxide and a metal hydrate in an, in an aqueous dispersion of a water-insoluble polymeric adhesive binder, and curing said flame retardant composition on said fiber, fabric, or fibrous composition.

2. A process as claimed in claim 1, wherein said fiber, fabric, or fibrous composition is cotton.

3. A process as claimed in claim 1, wherein a non-reactive high molecular weight polymeric latex is incorporated in said dispersion.

4. A process as claimed in claim 3, wherein said dispersion including said latex is cured by air-drying with subsequent heating of said flame retardant composition and the fibers or fabric or fibrous composition to which said flame retardant composition is applied at a temperature of about 140° C. to about 180° C.

5. A process as claimed in claim 1, wherein said metal oxide has the formula, $Me_2O_n$, wherein Me is aluminum, silicon, arsenic, bismuth, titanium, zirconium, molybdenum or antimony and n is the valence of the metal.

6. A process as claimed in claim 1, wherein said brominated compound is a polybrominated diphenyl oxide, a polybrominated diphenyl, a polybrominated cycloalkane, or a polybrominated bisphenol.

7. A process as claimed in claim 6, wherein said polybrominated diphenyl oxide is decabromodiphenyl oxide.

8. A flame retardant fiber, fabric or fibrous composition use in protective covering exposed to molten nonferrous metals that comprise a cellulose or polypeptide fiber, fabric or fibrous composition coated with a composition comprising a water-insoluble non-phosphorous containing, brominated, aromatic or cycloaliphatic organic compound, a metal oxide or a mixture of said oxide and a metal hydrate, a protective colloid as a thickening agent for said composition and a water-insoluble, polymeric adhesive binder or latex.

9. A flame retardant fiber or fibrous composition or fabric as claimed in claim 8, wherein said fiber, composition or fabric is comprises cotton, linen, jute, coconut fiber, rayon or wool.

10. A flame retardant fiber, composition or fabric as claimed in claim 8 wherein said fiber, composition or fabric is a cellulose.

11. A flame retardant fiber or fibrous composition or fabric as claimed in claim 8, wherein said cellulose is cotton.

12. A flame retardant fiber, fabric, or fibrous composition as claimed in claim 8, wherein said binder is a non-reactive high molecular weight polymeric latex.

13. A flame retardant fiber or fibrous composition or fabric as claimed in claim 12, wherein said dispersion including said latex is cured by air-drying with subsequent heating of said flame retardant composition and the fiber or fibrous composition or fabric to which said composition is applied at a temperature of about 140° C. to about 180° C.

14. A flame retardant fiber or fibrous composition or fabric as claimed in claim 8, wherein said metal oxide has the formula $Me_2O_n$ wherein Me is aluminum, silicon, arsenic, bismuth, titanium, zirconium, molybdenum or antimony and n is the valence of the metal.

15. A flame retardant fiber, composition or fabric as claimed in claim 8, wherein said brominated compound is a polybrominated diphenyl oxide, a polybrominated diphenyl, a polybrominated cycloalkane, a polybrominated bisphenol.

16. A flame retardant fiber, composition or fabric as claimed in claim 15, wherein said polybrominated diphenyl oxide is decabromodiphenyl oxide.

17. A flame retardant fiber, composition or fabric intended for use in garments worn by workers in nonferrous foundries wherein said fiber, composition or fabric is treated with a composition comprising a solid, water-insoluble non-phosphorus containing brominated aromatic or cycloaliphatic organic compound and a metallic oxide in admixture with an aqueous emulsion of a suitable water-insoluble high molecular weight polymeric adhesive binder, said brominated compound and metallic oxide being solids at room temperature, substantially totally insoluble in water, and being present in a weight ratio of 1:4 parts to 1.0:2 part of metallic oxide, said high molecular polymeric binder being present in amount sufficient to secure said brominated organic compound and metallic oxide to said fiber, composition or fabric after drying and curing thereof and wherein the total amount of flame retardant deposited on said fiber, composition or fabric is effective in reducing the flammability of the same without promoting the adhesion of molten non-ferrous metals to the fabric.

18. A fiber, composition or fabric of claim 17 wherein said binder is a polymer or copolymers of ester of acrylic acid, methacrylic acid, a styrene butadiene copolymer vinyl chloride, vinylidene chloride, vinyl acetate, acrylonitrile, an acrylamide or a polyurethane ester or ether.

19. A flame retardant fiber as claimed in claim 8 wherein said metal hydrate is alumina hydrate.

20. A flame retardant fiber, fabric or fibrous composition as claimed in claim 8 wherein said brominated aromatic or cycloaliphatic compound has an average particle size of up to about 20 microns.

21. A method as claimed in claim 1 wherein said fiber, fibrous composition or fabric is rendered flame resistant and resistant to adhesion of molten metals thereto that comprises impregnating said fiber, composition or fabric with a dispersion including said water-insoluble organic brominated compound wherein said brominated compound is a solid having an average particle size of up to about 20 microns, and said metallic oxide or mixture of said oxide and a metal hydrate in admixture with said aqueous dispersion and curing said dispersion on said fiber, fibrous composition or fabric.

* * * * *